United States Patent
Frey et al.

(10) Patent No.: US 11,691,611 B2
(45) Date of Patent: Jul. 4, 2023

(54) METHOD OF POWERING AN ELECTROMECHANICAL BRAKE ACTUATOR FOR AN AIRCRAFT WHEEL

(71) Applicant: SAFRAN LANDING SYSTEMS, Velizy Villacoublay (FR)

(72) Inventors: Olivier Frey, Moissy-Cramayel (FR); Frédéric Pithoud, Moissy-Cramayel (FR); Serge Barthelemy, Moissy-Cramayel (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 365 days.

(21) Appl. No.: 16/842,020

(22) Filed: Apr. 7, 2020

(65) Prior Publication Data

US 2020/0317178 A1 Oct. 8, 2020

(30) Foreign Application Priority Data

Apr. 8, 2019 (FR) ...................... 19 03752

(51) Int. Cl.
*B60T 13/74* (2006.01)
*H02P 29/40* (2016.01)
*B60T 8/17* (2006.01)

(52) U.S. Cl.
CPC .......... *B60T 13/746* (2013.01); *B60T 8/1703* (2013.01); *H02P 29/40* (2016.02); *B60T 2250/00* (2013.01)

(58) Field of Classification Search
None
See application file for complete search history.

(56) References Cited

U.S. PATENT DOCUMENTS

| | | | |
|---|---|---|---|
| 2007/0084682 A1 | 4/2007 | Griffith et al. | |
| 2010/0185376 A1* | 7/2010 | Onfroy | F16D 66/00 701/70 |
| 2015/0198930 A1* | 7/2015 | Antraygue | G05B 11/42 318/635 |

FOREIGN PATENT DOCUMENTS

| | | |
|---|---|---|
| EP | 2 213 534 A1 | 8/2010 |
| EP | 2 508 398 A1 | 10/2012 |
| EP | 2 724 907 A1 | 4/2014 |
| JP | 2017055552 A * | 3/2017 |

OTHER PUBLICATIONS

French Preliminary Search Report for 1903752 dated Dec. 10, 2019.

* cited by examiner

*Primary Examiner* — Todd Melton
*Assistant Examiner* — Jason R Roberson
(74) *Attorney, Agent, or Firm* — Sughrue Mion, PLLC

(57) ABSTRACT

The invention provides a method of electrically powering an electromechanical braking actuator (1) fitted to an aircraft wheel brake, in which the power supply current (I) delivered to the electromechanical braking actuator is saturated to a saturation value (Isat) in order to limit the current consumed by the electromechanical braking actuator and thereby limit the forces developed by the actuator. The method includes the step of determining the saturation value (Isat) as a function of an internal temperature (T) of the electromechanical braking actuator while it is in operation.

13 Claims, 3 Drawing Sheets

[Fig. 1]
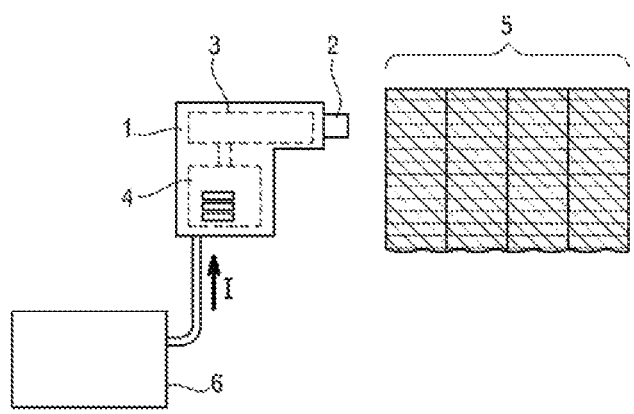
[Fig. 2a]
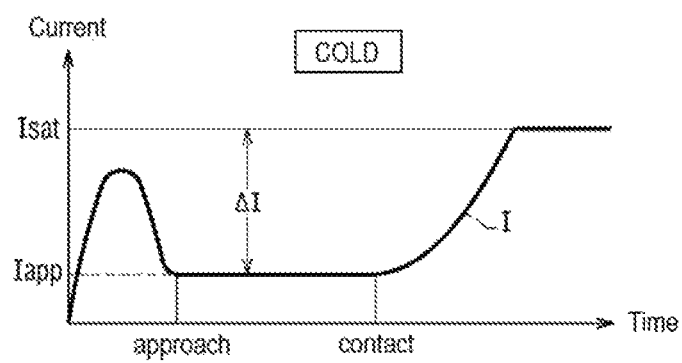

[Fig. 2b]
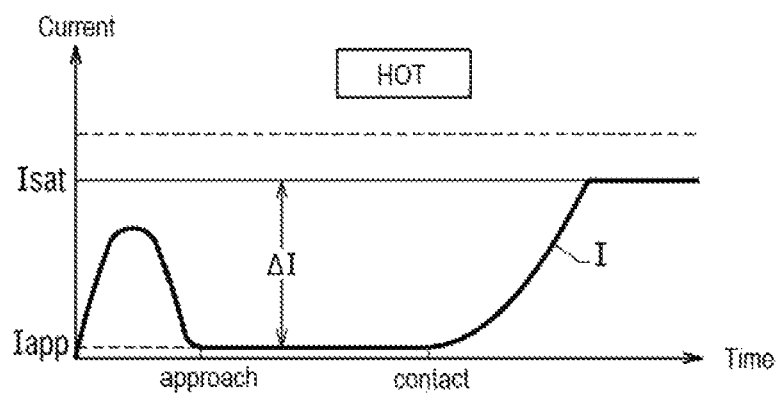
[Fig. 3]
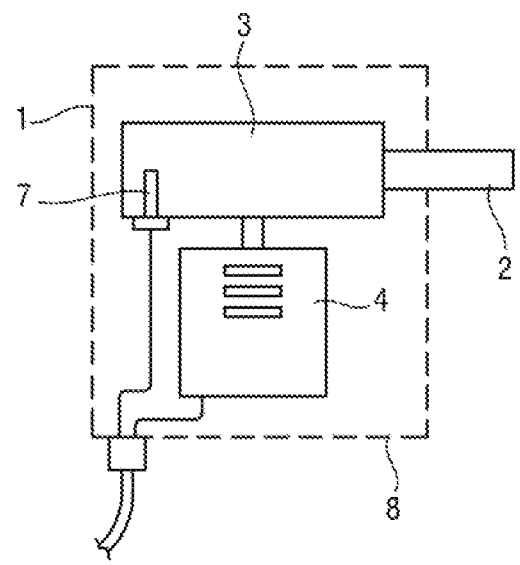

[Fig. 4]
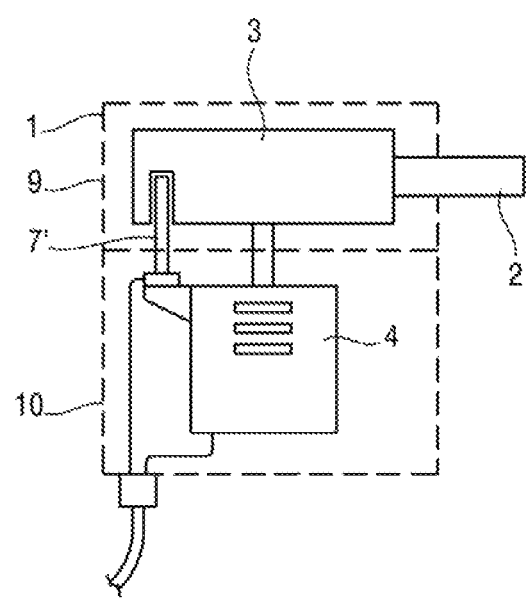

METHOD OF POWERING AN ELECTROMECHANICAL BRAKE ACTUATOR FOR AN AIRCRAFT WHEEL

BACKGROUND OF THE INVENTION

An aircraft is generally provided with brakes for exerting braking torque selectively on some of its wheels for the purpose of slowing down rotation of the wheels and thus for the purpose of decelerating the aircraft while it is moving on the ground.

Certain brakes are provided with electromechanical actuators (EMAs), each comprising a pusher that is moved by an electric motor acting via a mechanical transmission in order to apply a force selectively on friction members of the brake and thereby generate braking torque.

The member managing the electrical power supplied to the braking EMAs includes a member for saturating the consumption of electric current in order to protect the electric motor and limit internal forces.

Braking EMAs are subjected both to low temperatures while in flight, and also to high temperatures that result from their proximity with the friction members of the brake, which members can give off a large quantity of heat during braking. Relatively low or high temperatures can also occur on the ground as a result of weather conditions. The mechanical transmission of a braking EMA contains a lubricant having physical characteristics of that vary very considerably as a function of temperature, such that braking EMAs possess operating characteristics that are highly dependent on operating temperature. Typically, the lubricant possesses high viscosity when cold, thereby reducing the mechanical performance of the actuator. When cold, in order to achieve the same pressing force, the electric motor therefore needs to deliver higher torque than when hot, and thus needs to operate at higher current than when hot. Thus, saturation of the electric power supply current needs to be set to a maximum value that is high enough for operating when cold. When hot, the lubricant is much more fluid and gives rise to smaller mechanical losses. If the motor then operates with current that reaches that low-temperature maximum saturation value, the mechanical stresses in the mechanical transmission from the electric motor to the pusher are therefore greater, thereby requiring the parts of the electric motor and of the mechanical transmission to be over-dimensioned so they can operate when hot.

Thus, optimum utilization of braking EMAs over a wide range of temperatures requires several subassemblies of braking EMAs to be over-dimensioned, thereby giving rise to an increase in the weight and the volume of the equipment.

OBJECT OF THE INVENTION

The invention seeks to provide a method of powering braking EMAs of an aircraft that enables such over-dimensioning to be avoided.

SUMMARY OF THE INVENTION

To this end, the invention provides a method of electrically powering an electromechanical braking actuator fitted to an aircraft wheel brake, in which the power supply current delivered to the electromechanical braking actuator is saturated to a saturation value in order to limit the power supply current consumed by the electromechanical braking actuator and thereby limit the forces developed thereby. According to the invention, the method includes the step of determining the saturation value as a function of an internal temperature of the electromechanical braking actuator while it is in operation.

Thus, it is possible, temporarily, to increase the saturation value Isat when it is detected that the internal temperature of the electromechanical braking actuator is low, and it is possible to lower the saturation value Isat when the electromechanical braking actuator is hot. Thus, the maximum force that can be developed by the electromechanical braking actuator does not run the risk of increasing as the temperature of the electromechanical braking actuator rises, thereby protecting the electromechanical braking actuator and its internal components.

In a first particular implementation of the method of the invention, the value of an approach current flowing through the motor of the electromechanical braking actuator during an approach stage at a given speed is measured, and an additional current is added to the measured value of the approach current in order to determine the saturation value.

For a given travel speed, the approach current as measured in this way when cold is greater than the same current Iapp as measured when hot, which is a direct effect of the internal temperature of the electromechanical braking actuator. Advantage is taken of the un-loaded movement of the electromechanical braking actuator while its pusher is going towards the friction elements of the brake in order to take the measurement. Sufficient time is available for the approach current to stabilize and for the measurement taken in this way to be reliable.

The saturation value may be determined during each approach stage of the electromechanical braking actuator, i.e. each time the brake is applied.

In another particular implementation of the method of the invention, the saturation value is determined by using a measurement of the internal temperature of the braking actuator.

BRIEF DESCRIPTION OF THE DRAWINGS

The invention can be better understood in the light of the following description of particular implementations given with reference to the accompanying drawings, in which:

FIG. 1 is a diagrammatic view of a prior art aircraft brake including an electromechanical braking actuator acting on friction elements;

FIG. 2a is a graph plotting current flowing through the electromechanical braking actuator when it is cold;

FIG. 2b is a graph plotting current flowing through the electromechanical braking actuator when it is hot;

FIG. 3 is a diagrammatic view of an electromechanical braking actuator having a single casing and including a temperature sensor for performing the method of the invention; and FIG. 4 is a diagrammatic view of an electromechanical braking actuator having two casings and including a temperature sensor for performing the method of the invention.

DETAILED DESCRIPTION OF THE INVENTION

With reference to FIG. 1, the method of the invention applies to an aircraft brake having at least one electromechanical braking actuator 1 comprising a pusher 2 that is moved by an electric motor 4 acting via a mechanical transmission 3 to apply a force selectively on friction members 5 of the brake, thereby generating braking torque suitable for slowing down rotation of the associated wheel. A member 6 for managing power supply delivers a power supply current I to the electric motor 4 in order to respond to braking requests coming either from the pilot acting on brake pedals, or else from a brake control unit that automatically generates a setpoint for braking or for deceleration.

In this example, in order to avoid any damage to the electromechanical braking actuator 1, the member 6 for managing power supply includes a protection member for limiting the power supply current I drawn by the actuator 1 to a saturation value referred to herein as Isat.

In a first particular implementation of the method of the invention, as shown in FIGS. 2a and 2b, the approach current Iapp as drawn by the electromechanical braking actuator 1 while the pusher 2 is approaching the friction elements 5 is measured. Preferably, the pusher 2 is caused to move at a predetermined constant speed so that the various measurements of the approach current Iapp are performed under similar operating conditions. In the figures, it can be seen during the approach stage, the current I drawn by the electromechanical braking actuator 1 presents an initial transient and then stabilizes on a value Iapp. The current I then increases suddenly when the pusher 2 comes into contact with the friction elements 5. In order to determine the saturation value Isat, an additional current ΔI is added to the measured approach current, thereby making it possible to set a saturation value Isat that depends on the internal temperature, since the approach current Iapp depends strongly on said internal temperature. Specifically, FIG. 2a relates to the electromechanical braking actuator 1 operating when cold, while FIG. 2b relates to the electromechanical braking actuator operating when hot. It can be seen that when cold, the approach current Iapp is higher than the same approach current Iapp when hot, which has the effect that the saturation values Isat when hot is lower than the saturation value when cold (marked in dashed lines in FIG. 2b). The reduction in the saturation value Isat when the electromechanical braking actuator 1 is hot makes it possible to avoid an excessive force that might damage the electromechanical braking actuator.

In a first a variant, the value of the additional current ΔI is constant and independent of the internal temperature of the electromechanical braking actuator, thus making it very simple to determine the saturation value. In a variant that is an alternative to the first, the additional current ΔI is caused to depend on the internal temperature of the actuator, e.g. by setting it to a value that is proportional to the approach current. In another variant, the saturation value Isat as determined in this way is adjusted to lie between a minimum saturation value Imin and a maximum saturation value Imax if the saturation values Isat as determined by the method of the invention lies outside these current values. The adjustment may consist in limiting the saturation value Isat to Imin if Isat<Imin, or to Imax if Isat>Imax.

In a second particular implementation of the method of the invention, the electromechanical braking actuator is provided with a temperature sensor for measuring an internal temperature T of the electromechanical braking actuator 1 while it is in operation, and in particular a temperature of the lubricant contained in the mechanical transmission. This temperature measurement then makes it possible to calculate the saturation value Isat as a function of the internal temperature of the actuator, e.g. by using a table of values included in a memory and giving Isat as a function of values for T, or else by using a pre-programmed function Isat=f(T). This calculation may be performed continuously, or at regular time intervals.

FIG. 3 shows a temperature sensor 7 installed in an electromechanical actuator 1 having a single casing, i.e. in which the electric motor 4 and the mechanical transmission 3 are contained in the same casing 8, represented by dashed lines. The temperature sensor 7 is installed on the mechanical transmission 3 so as to measure as directly as possible the temperature of the lubricant inside the mechanical transmission 3.

FIG. 4 shows a temperature sensor 7' installed in an electromechanical braking actuator 1 having two casings, in which the electric motor 4 is contained in a first casing 10 and a mechanical transmission 3 and the pusher 2 are contained in a second casing 9, the casings 9 and 10 being assembled together to constitute the electromechanical braking actuator 1. Under such circumstances, it is preferable for the temperature sensor 7' to be secured to the casing 9 that contains electric motor 3, in order to be able to group its electrical connections together with the electrical connections of the electric motor 3. The temperature of the lubricant in the mechanical transmission is then measured indirectly, e.g. by conduction through the second casing 9.

Preferably, if the brake is provided with a plurality of electromechanical braking actuators, the internal temperature measurements from the various electromechanical braking actuators are compared in order to detect and eliminate any outlier measurement, and in order to replace it with an acceptable value, e.g. with an average of the temperature measurements that have not been eliminated. In a variant, it is possible, additionally or alternatively, to make use of temperatures that are estimated from the approach currents Iapp.

The invention is not limited to the above description, but on the contrary covers any variant coming within the ambit defined by the claims.

In particular, the brake could have a structure that is different from that described and shown, as could the electromechanical actuator.

When the method of the invention is applied to a brake having a plurality of electromechanical braking actuators 1, the method may advantageously comprise the steps of comparing the values of the approach currents Iapp from the various electromechanical braking actuators 1 in order to detect and eliminate any outlier value and replace it with a corrected value, e.g. the average of the approach current values that have not been eliminated.

The invention claimed is:

1. A method of electrically powering an electro-mechanical braking actuator fitted to an aircraft wheel brake, said actuator including a pusher movable to apply a force selectively on friction members of the brake thereby generating braking torque suitable for slowing down rotation of the associated wheel, the method comprising:

determining a saturation value of a power supply current as a function of an internal temperature of the electromechanical braking actuator while the electro-mechanical braking actuator is in operation;

delivering the power supply current the electro-mechanical braking actuator so that the power supply current is saturated to the saturation value in order to limit the current consumed by the electro-mechanical braking actuator and thereby limit the forces developed by the electro-mechanical braking actuator.

2. The method according to claim 1, comprising measuring a value of an approach current flowing through an electric motor of the electro-mechanical braking actuator when the pusher is approached at a given speed towards the friction members, which value depends on the internal temperature of the electro-mechanical braking actuator, adding an additional current to the measured value of the approach current in order to determine the saturation value.

3. The method according to claim 2, wherein the additional current is constant and independent of the internal temperature of the electro-mechanical braking actuator.

4. The method according to claim 2, wherein the additional current is determined as a function of the internal temperature of the electro-mechanical braking actuator or as a function of the value of the approach current.

5. A method of electrically powering an electro-mechanical braking actuator fitted to an aircraft wheel brake, the method comprising:
   determining a saturation value of a power supply current as a function of an internal temperature of the electro-mechanical braking actuator while the electro-mechanical braking actuator is in operation, by measuring a value of an approach current flowing through an electric motor of the electro-mechanical braking actuator during an approach stage at a given speed, which value depends on the internal temperature of the electro-mechanical braking actuator, and adding an additional current to the measured value of the approach current in order to determine the saturation value, the saturation value being adjusted so that the saturation value lies in the range from a predetermined minimum value to a predetermined maximum value; and
   delivering the power supply current to the electro-mechanical braking actuator so that the power supply current is saturated to the saturation value in order to limit the current consumed by the electro-mechanical braking actuator and thereby limit the forces developed by the electro-mechanical braking actuator.

6. A method of electrically powering electro-mechanical braking actuators fitted to an aircraft wheel brake, the method comprising:
   determining a saturation value of a power supply current as a function of an internal temperature of the electro-mechanical braking actuator while the electro-mechanical braking actuator is in operation, by measuring a value of an approach current flowing through an electric motor of the electro-mechanical braking actuator during an approach stage at a given speed, which value depends on the internal temperature of the electro-mechanical braking actuator, and adding an additional current to the measured value of the approach current in order to determine the saturation value, wherein the approach current values of the various electro-mechanical braking actuators are compared in order to detect and eliminate any outlier value, and to replace the outlier value with a corrected value; and
   delivering the power supply current to the electro-mechanical braking actuator so that the power supply current is saturated to the saturation value in order to limit the current consumed by the electro-mechanical braking actuator and thereby limit the forces developed by the electro-mechanical braking actuator.

7. The method according to claim 1, wherein the internal temperature of the electro-mechanical braking actuator is measured and the saturation value is calculated using the internal temperature.

8. A method of electrically powering an electro-mechanical braking actuator fitted to an aircraft wheel brake, the method comprising:
   determining a saturation value of a power supply current as a function of an internal temperature of the electro-mechanical braking actuator while the electro-mechanical braking actuator is in operation; wherein the internal temperature of the electro-mechanical braking actuator is measured and the saturation value is calculated using the internal temperature, the saturation value being calculated as a function of the temperature by using a table of values or a function; and
   delivering the power supply current to the electro-mechanical braking actuator so that the power supply current is saturated to the saturation value in order to limit the current consumed by the electro-mechanical braking actuator and thereby limit the forces developed by the electro-mechanical braking actuator.

9. A method of electrically powering an electro-mechanical braking actuator fitted-to-an-aircraft wheel brake, the electro-mechanical actuator having a single casing, the method comprising:
   determining a saturation value of a power supply current as a function of an internal temperature of the electro-mechanical braking actuator while the electro-mechanical braking actuator is in operation; wherein the internal temperature of the electro-mechanical braking actuator is measured and the saturation value is calculated using the internal temperature, and wherein, in order to determine the internal temperature, a temperature sensor is arranged to measure directly the temperature of a lubricant of a mechanical transmission arranged between an electric motor and the pusher of the electro-mechanical braking actuator; and
   delivering the power supply current to the electro-mechanical braking actuator so that the power supply current is saturated to the saturation value in order to limit the current consumed by the electro-mechanical braking actuator and thereby limit the forces developed by the electro-mechanical braking actuator.

10. A method of electrically powering an electro-mechanical braking actuator fitted to an aircraft wheel brake, the actuator having two casings, with a first casing containing an electric motor of the electro-mechanical braking actuator and a second casing containing a mechanical transmission and a pusher of the electro-mechanical braking actuator, the method comprising:
    determining a saturation value of a power supply current as a function of an internal temperature of the electro-mechanical braking actuator while the electro-mechanical braking actuator is in operation, wherein the internal temperature of the electro-mechanical braking actuator is measured and the saturation value is calculated using the internal temperature, and wherein, in order to determine the internal temperature, a temperature sensor is arranged in the first casing in order to measure indirectly the temperature of a lubricant of the mechanical transmission contained in the second casing; and
    delivering the power supply current to the electro-mechanical braking actuator so that the power supply current is saturated to the saturation value in order to limit the current consumed by the electro-mechanical braking actuator and thereby limit the forces developed by the electro-mechanical braking actuator.

11. A method of electrically powering a plurality of electro-mechanical braking actuators fitted to an aircraft wheel brake, the method comprising:
    determining a saturation value of a power supply current as a function of an internal temperature of the electromechanical braking actuator while the electro-mechanical braking actuator is in operation; wherein the internal temperature of the electro-mechanical braking actuator is measured and the saturation value is calculated using the internal temperature, and wherein the internal temperature measurements of the various electro-mechanical braking actuators are compared in order to detect and eliminate any outlier measurement and replace the outlier measurement with a corrected value; and delivering the power supply current to the electro-mechanical braking actuator so that the power supply current is saturated to the saturation value in order to limit the current consumed by the electro-mechanical braking actuator and thereby limit the forces developed by the electro-mechanical braking actuator.

12. The method according to claim 6, wherein the corrected value is an average of the approach current values that have not been eliminated.

13. The method according to claim 11, wherein the corrected value is an average of the approach current values that have not been eliminated.

* * * * *